United States Patent
Krishnan et al.

(10) Patent No.: US 9,555,579 B2
(45) Date of Patent: Jan. 31, 2017

(54) TENSION MEMBER AND POLYMER JACKET ASSEMBLY INCLUDING A GEOMETRY STABILIZER IN THE JACKET

(71) Applicant: OTIS ELEVATOR COMPANY, Farmington, CT (US)

(72) Inventors: Gopal R. Krishnan, Wethersfield, CT (US); Xiaomei Yu, Glastonbury, CT (US); John P. Wesson, Vernon, CT (US); John M. Milton-Benoit, West Suffield, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 14/026,554

(22) Filed: Sep. 13, 2013

(65) Prior Publication Data

US 2014/0015168 A1 Jan. 16, 2014

Related U.S. Application Data

(62) Division of application No. 13/002,353, filed on Jan. 3, 2011, now abandoned.

(51) Int. Cl.
*B29C 63/22* (2006.01)
*B29C 70/70* (2006.01)
*B66B 23/24* (2006.01)

(52) U.S. Cl.
CPC ............... *B29C 63/22* (2013.01); *B29C 70/70* (2013.01); *B66B 23/24* (2013.01)

(58) Field of Classification Search
CPC ........... B29C 63/22; B29C 70/70; B66B 23/24
USPC ......... 264/261, 279, 171.14, 171.16, 171.19, 264/171.21, 171.24, 171.23, 80, 271.1, 264/279.1, 45.5
See application file for complete search history.

(56) References Cited

U.S. PATENT DOCUMENTS

| | | | |
|---|---|---|---|
| 5,819,946 | A | 10/1998 | Whitlock et al. |
| 6,777,466 | B2 | 8/2004 | Eckstein et al. |
| 7,168,231 | B1 | 1/2007 | Chou et al. |
| 7,772,322 | B2 | 8/2010 | Kosaka et al. |
| 2004/0002272 | A1 | 1/2004 | Land |
| 2005/0288402 | A1 | 12/2005 | Kosaka et al. |

(Continued)

FOREIGN PATENT DOCUMENTS

| | | |
|---|---|---|
| CN | 1304962 A | 7/2001 |
| EP | 1671913 A2 | 6/2006 |

(Continued)

OTHER PUBLICATIONS

Hummel Croton Inc.; "Melamine Phosphate" [Online] Apr. 15, 2007, XP-002525050, Retrieved from the Internet: URL:http://www.hummelcroton.com/data/mop_d.html>(retrieved on Apr. 23, 2009) p. 1-p. 2.

(Continued)

*Primary Examiner* — Alison L Hindenlang
*Assistant Examiner* — Lawrence D Hohenbrink, Jr.
(74) *Attorney, Agent, or Firm* — Carlson, Gaskey & Olds, P.C.

(57) ABSTRACT

An exemplary assembly includes at least one elongated tension member. A jacket covers at least some of the tension member. The polymer jacket comprises a polymer material including a melamine based geometry stabilizer that facilitates maintaining the jacket material near the tension member if the assembly is subjected to a high temperature condition.

9 Claims, 3 Drawing Sheets

(56) References Cited

U.S. PATENT DOCUMENTS

2006/0182967 A1* 8/2006 Kosaka ................... C08L 71/12
428/378
2010/0137467 A1* 6/2010 Stowell .............. C08G 18/3851
521/155

FOREIGN PATENT DOCUMENTS

| GB | 1408133 | * | 1/1975 | |
|---|---|---|---|---|
| GB | 1408133 | | 10/1975 | |
| GB | 1408133 A | * | 10/1975 | ............... C08K 3/32 |
| JP | 56122856 | | 9/1981 | |
| WO | 9627635 | | 9/1996 | |
| WO | 0037738 | | 8/1999 | |
| WO | 0037738 | | 6/2000 | |
| WO | WO 0037738 A1 | * | 6/2000 | |
| WO | 2005097900 A1 | | 10/2005 | |
| WO | 2007006989 A2 | | 1/2007 | |
| WO | 2010019152 A1 | | 8/2008 | |
| WO | 2010019149 A1 | | 2/2010 | |
| WO | WO 2010019151 A1 | * | 2/2010 | |

OTHER PUBLICATIONS

International Search Report and Written Opinion of the International Searching Authority for International Application No. PCT/US2008/073234 mailed Dec. 5, 2009.
International Preliminary Report on Patentability for International application No. PCT/US2008/073234 mailed Feb. 24, 2011.

* cited by examiner ized. For example, a base ferrous metal may be coated or plated with zinc, tin or copper.

TENSION MEMBER AND POLYMER JACKET ASSEMBLY INCLUDING A GEOMETRY STABILIZER IN THE JACKET

CROSS-REFERENCE TO RELATED APPLICATIONS

This application is a divisional of U.S. patent application Ser. No. 13/002,353 filed Jan. 3, 2011.

BACKGROUND

There are various uses for elongated flexible assemblies such as for elevator load bearing members or roping arrangements, drive belts for machines such as a passenger conveyor and handrails for passenger conveyors, for example. Such assemblies may be designed with a plurality of cords covered by a polyurethane jacket. For example, U.S. Pat. Nos. 6,295,799 and 6,739,433 show belts for use in suspending an elevator car and counterweight within an elevator system. An example passenger conveyor handrail construction is shown in U.S. Pat. No. 4,982,829. An example passenger conveyor drive belt is shown in U.S. Pat. No. 6,540,060.

With such assemblies, the polymer jacket may melt in extremely high temperature conditions such as when there is a fire in the vicinity of the assembly. Melting jacket material may drip onto other system components or structures in an undesirable manner. For example, molten jacket material of an elevator load bearing member may drip onto the top of the elevator car or onto the floor surface of an elevator pit. In the case of a passenger conveyor, the handrail may drop onto the balustrade or other components associated with the truss of the conveyor. Similarly, a drive belt in a passenger conveyor may melt and drip onto the drive components.

It would be useful to be able to minimize or avoid such dripping or flowing of the material of a polymer jacket in the event of high temperature conditions such as during a fire.

SUMMARY

An exemplary assembly includes at least one elongated tension member. A jacket covers at least some of the tension member. The jacket comprises a polymer material including a melamine based geometry stabilizer that facilitates maintaining the jacket material near the tension member if the assembly is subjected to a high temperature condition.

An exemplary method of making an assembly having at least one elongated cord tension member at least partially covered by a polymer jacket includes mixing a melamine based geometry stabilizer with a base jacket resin to provide a master batch of mixed material. The mixed material is compounded with a base polymer to provide the jacket material. The jacket material is then molded into a desired shape of the jacket.

The various features and advantages of this invention will become apparent to those skilled in the art from the following detailed description. The drawings that accompany the detailed description can be briefly described as follows.

DETAILED DESCRIPTION

Figure 1:
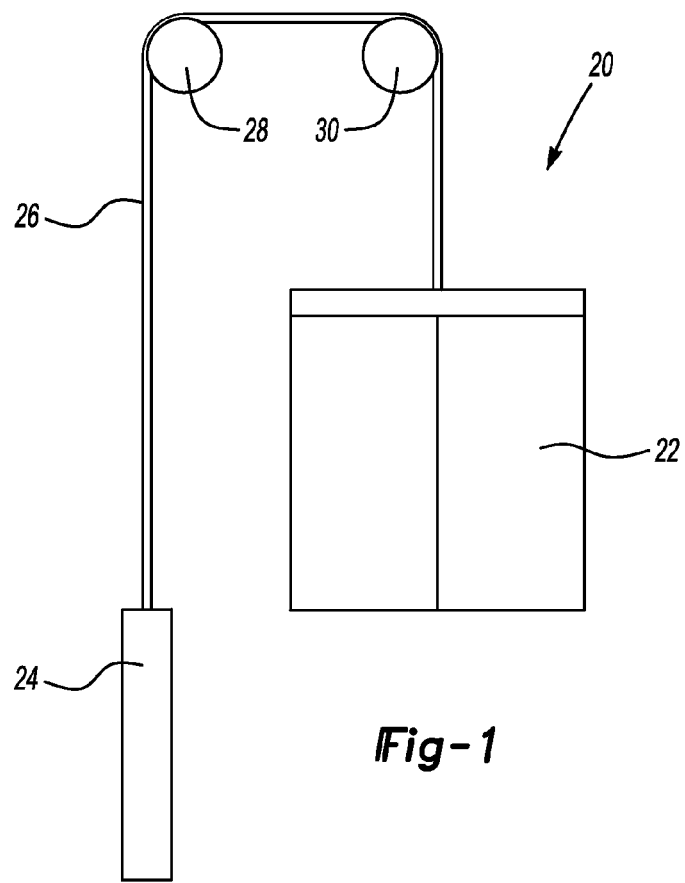
FIG. 1 schematically illustrates selected portions of an elevator system including a load bearing member designed according to an embodiment of this invention.

FIG. 1 schematically shows selected portions of an example elevator system 20. An elevator car 22 and counterweight 24 are suspended by a load bearing assembly 26. In one example, the load bearing assembly 26 comprises a plurality of flat belts. In another example, the load bearing assembly 26 comprises a plurality of round ropes.

The load bearing assembly 26 supports the weight of the elevator car 22 and the counterweight 24 and facilitates movement of the elevator car 22 into desired positions by moving along sheaves 28 and 30. One of the sheaves will be a traction sheave that is moved by an elevator machine in a known manner to cause the desired movement and placement of the elevator car 22. The other sheave in this example is an idler sheave.

Figure 2:
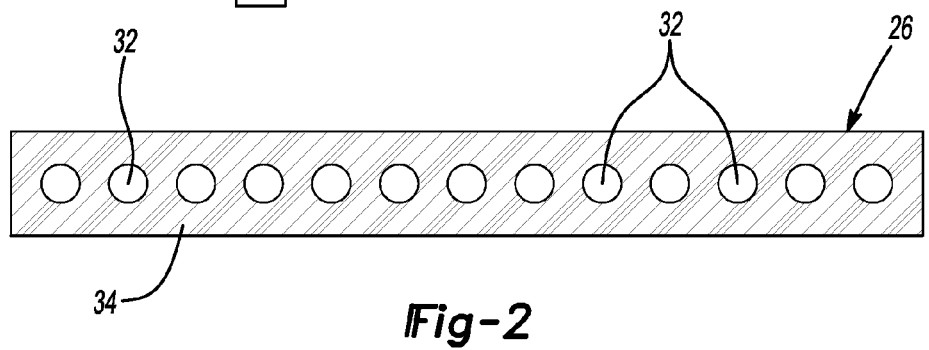
FIG. 2 is an end view schematically showing one example elevator load bearing member assembly.

FIG. 2 is an end view schematically showing one example flat belt configuration of the example load bearing assembly 26. In this example, the flat belt includes a plurality of elongated cord tension members 32 and a polymer jacket 34 that contacts the tension members 32. In this example, the jacket 34 encases the tension members 32. In one example, the tension members 32 comprise wound metallic cords, such as steel. The polymer jacket 34 in one example comprises a thermoplastic elastomer. In one example, the jacket 34 comprises a thermoplastic polyurethane.

Figure 3:
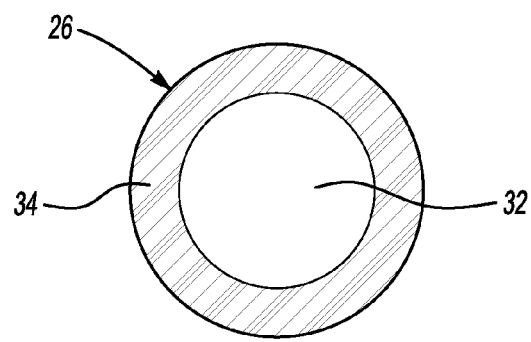
FIG. 3 is an end view schematically illustrating another example elevator load bearing assembly.

Another example is schematically shown in FIG. 3. An end view of a rope used as part of the load bearing assembly 26 includes at least one tension member 32 and a polymer jacket 34. In the example of FIG. 3, the same materials can be used as those mentioned above.

Figure 4:
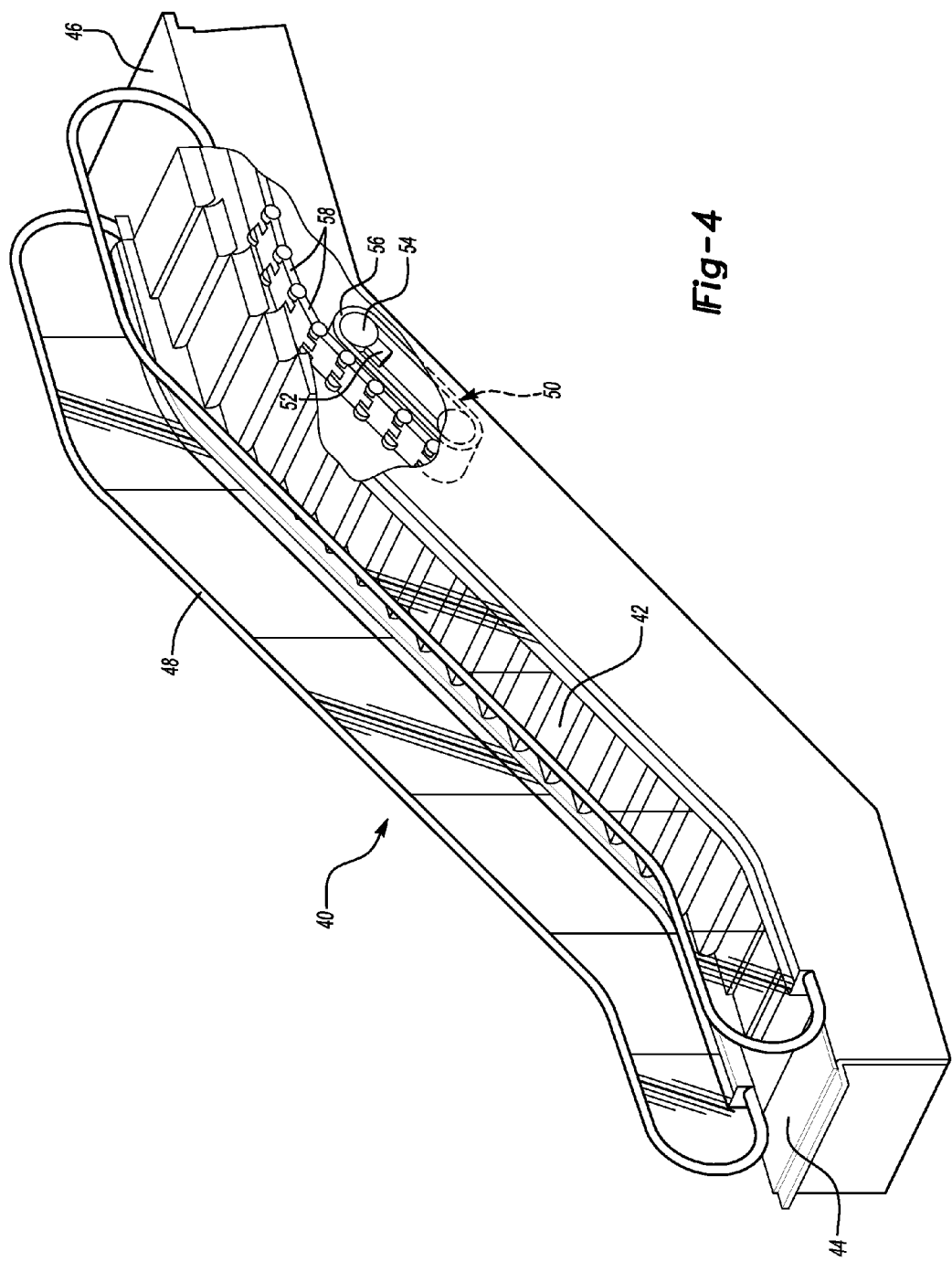
FIG. 4 diagrammatically illustrates a passenger conveyor including a drive belt and a handrail designed according to an embodiment of this invention.

FIG. 4 schematically illustrates an example passenger conveyor 40. In this example, a plurality of steps 42 move in a known manner to carry passengers between landings 44 and 46. A handrail 48 is provided for passengers to grab onto while traveling on the conveyor 40.

Figure 6:
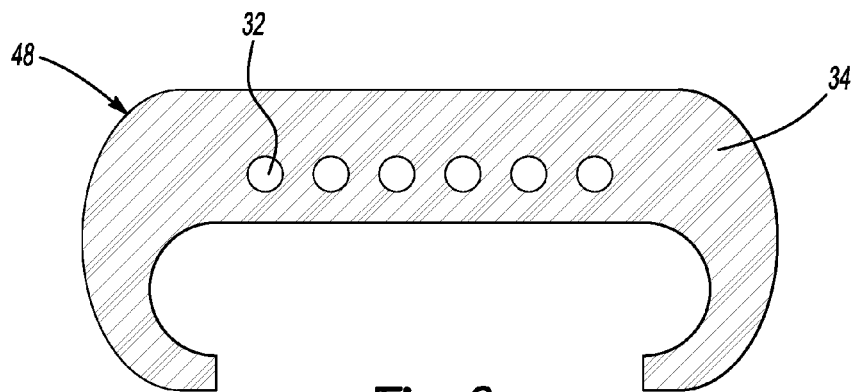
FIG. 6 schematically shows an example handrail configuration.

As shown in FIG. 6, the handrail 48 includes a plurality of tension members 32 such as steel cords at least partially covered by a polymer jacket 34. The polymer jacket in this example establishes the gripping surface and the body of the handrail 48.

Figure 5:
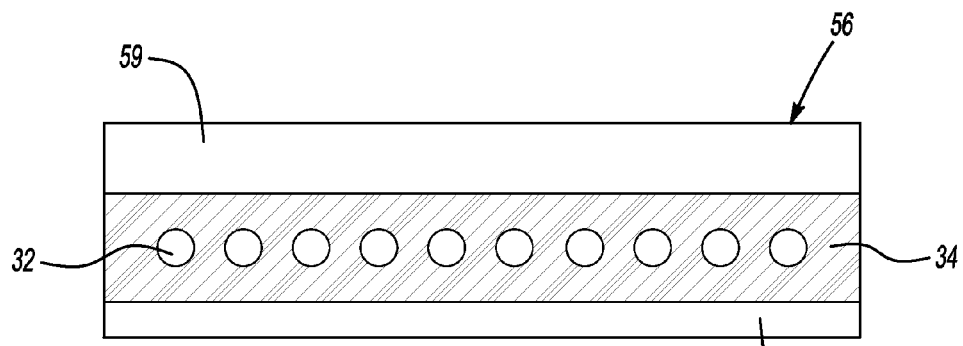
FIG. 5 schematically shows an example drive belt configuration.

The example of FIG. 4 and includes a drive arrangement 50 for propelling the steps 42 in a desired direction. A motor 52 rotates a drive sheave 54 to cause movement of a drive belt 56. As shown in FIG. 5, the example drive belt 56 has a plurality of elongated cord tension members 32 covered by a jacket 34. The jacket material establishes teeth 57 that interact with a corresponding surface on the drive sheave 54. A step chain 58 (FIG. 4) is engaged by teeth 59 on the drive belt 56 to cause the desired movement of the steps 42.

When a metal is used for the any of the example tension members 32, the metal material may be uncoated, coated, or plated with a protective metal. For example, a base ferrous metal may be coated or plated with zinc, tin or copper.

In each of the above example assemblies, the jacket material includes a geometry stabilizer that facilitates maintaining the jacket material near the tension member or tension members even in high temperature conditions such as those associated with a fire in the vicinity of the assembly. The geometry stabilizer in some examples works by cross linking or forming a flow-resistant char or gel that inhibits flow of the thermoplastic polymer of the jacket material. Example geometry stabilizers include melamine phosphate and melamine polyphosphate, which are useful when the jacket comprises a base thermoplastic elastomer such as thermoplastic polyurethane. Another example geometry stabilizer is hydrocarbon phosphate, which is useful when the jacket comprises an elastomeric alloy, such as a melt-processible rubber.

The example geometry stabilizers provide flame retardancy through intumescence and char formation that prevents the jacket material from melting and dripping away from the associated tension members. In other words, the geometry stabilizer provides an intumescent shell that reduces the likelihood of the jacket material dripping or flowing onto nearby surfaces. The example geometry stabilizers are useful in that they have chemistry similar to the base material of the jacket so that they do not reduce the flexibility of the jacket or otherwise interfere with the characteristics of the jacket that are selected for the particular installation.

Figure 7:
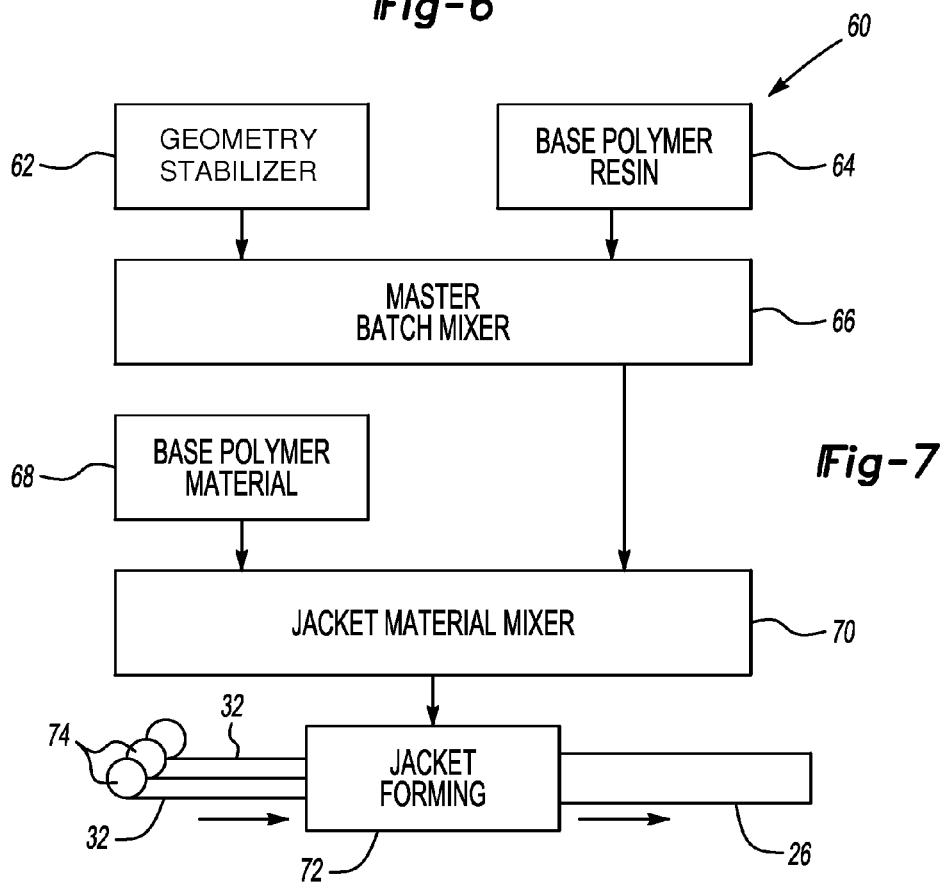
FIG. 7 schematically illustrates an example method of making an assembly designed according to an embodiment of this invention.

FIG. 7 schematically shows an example method 60 for making an assembly. A supply 62 of a selected geometry stabilizer such as one of the phosphate-based geometry stabilizers mentioned above is mixed with a supply of a base polymer resin 64 in a master batch mixer 66. The amount of geometry stabilizer 62 provided within the master batch of mixed material may comprise up to 50% by weight of the mixed material. One example includes using between 20% and 50% by weight of the geometry stabilizer 62.

The resulting master batch of mixed material in this example is then compounded with a base polymer material 68 in a jacket material mixer 70. The resulting jacket material after the mixing at 70 may contain up to 20% by weight of the geometry stabilizer. One example includes using between 2% and 20% by weight of the geometry stabilizer in the jacket material.

The jacket material is then formed in a jacket forming station 72 such as a molding device to provide the desired geometry of the jacket. In the illustrated example, a plurality of spools 74 supply tension members 32 to the jacket forming station 72 whether the jacket is molded onto at least one exterior surface of the tension members 32 resulting in the desired assembly. In the case of FIG. 7, the resulting assembly is an elevator load bearing member 26.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making an assembly having at least one elongated cord tension member at least partially covered by a polymer jacket, comprising the steps of:
    mixing a polymer base resin and a melamine-based geometry stabilizer to provide a batch of mixed material, the geometry stabilizer being operative to form a stable, intumescent shell on an exterior of the jacket of the assembly responsive to a fire condition;
    compounding said batch of mixed material with polyurethane to provide a batch of jacket material; and
    forming the jacket material into a desired shape of the jacket.

2. The method of claim 1, wherein the geometry stabilizer comprises phosphate.

3. The method of claim 1, wherein the geometry stabilizer comprises at least one of melamine-phosphate or melamine-polyphosphate.

4. The method of claim 1, wherein the mixing comprises using an amount corresponding up to 50% by weight of the geometry stabilizer in the batch of mixed material.

5. The method of claim 4, wherein the mixing comprises using an amount corresponding to between 20% and 50% by weight of the geometry stabilizer in the batch of mixed material.

6. The method of claim 1, wherein the mixing comprises using an amount corresponding to about 20% by weight of the geometry stabilizer in the batch of mixed material.

7. The method of claim 1, wherein the compounding comprises using an amount corresponding to between about 2% and about 20% by weight of the geometry stabilizer in the jacket material.

8. The method of claim 1, comprising
    applying the jacket material to the at least one elongated cord tension member while forming the jacket material.

9. The method of claim 1, wherein, the geometry stabilizer is capable of maintaining the jacket material near the tension member of the assembly.

* * * * *